UNITED STATES PATENT OFFICE.

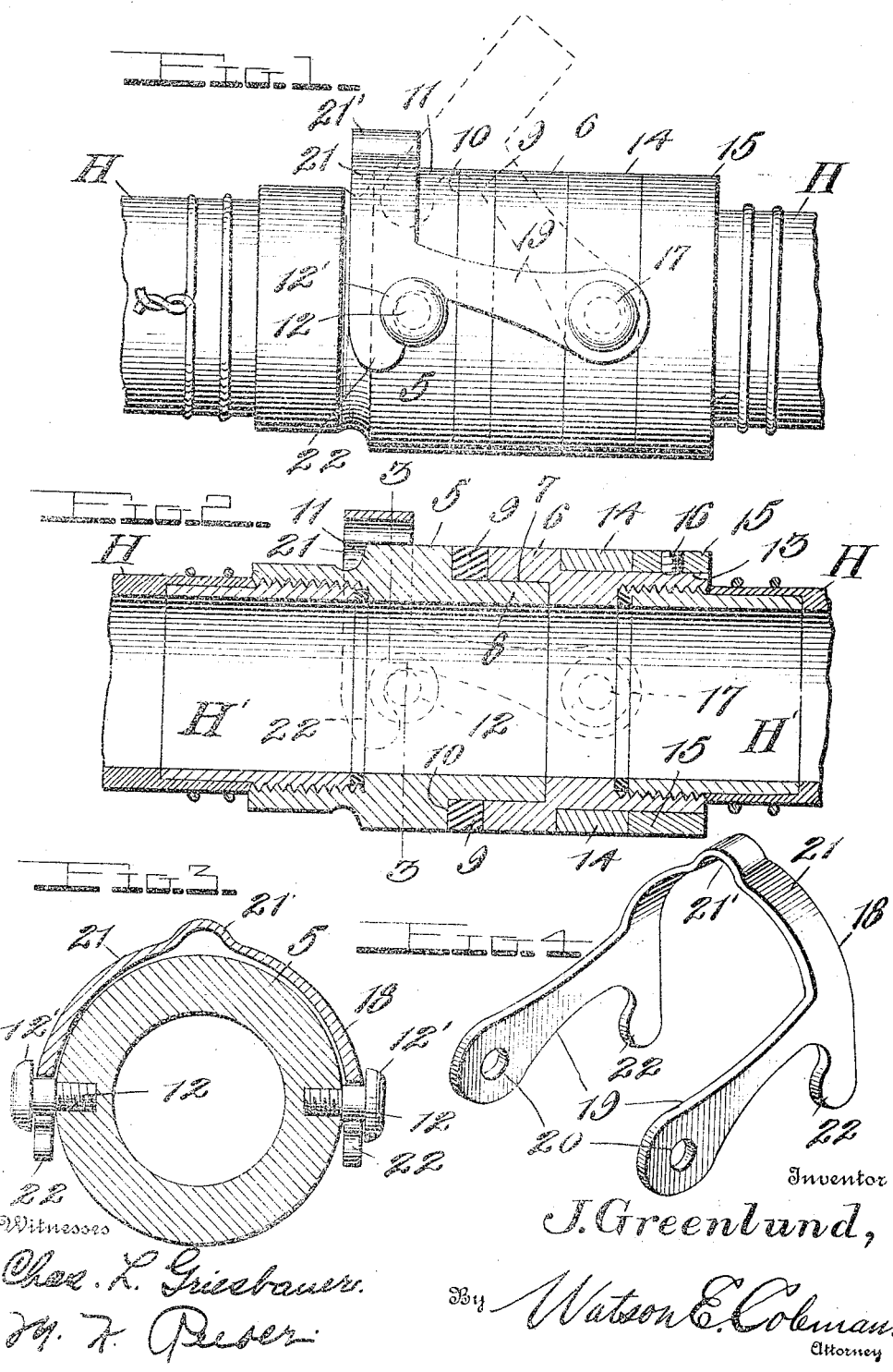

JOHN GREENLUND, OF UNION CITY, PENNSYLVANIA.

HOSE-COUPLING.

996,079. Specification of Letters Patent. Patented June 27, 1911.

Application filed December 29, 1910. Serial No. 599,911.

*To all whom it may concern:*

Be it known that I, JOHN GREENLUND, a citizen of the United States, residing at Union City, in the county of Erie and State of Pennsylvania, have invented certain new and useful Improvements in Hose-Couplings, of which the following is a specification, reference being had to the accompanying drawings.

This invention relates to improvements in hose couplings and has for its object to provide a very simple and efficient device of this character whereby two sections of hose may be easily, quickly and securely coupled together.

Another object of the invention is to provide a hose coupler which is extremely strong and durable, consists of but few parts, and one which may be manufactured at a low cost.

With the above and other objects in view, the invention consists of the novel features of construction, combination and arrangement of parts hereinafter fully described and claimed, and illustrated in the accompanying drawings, in which—

Figure 1 is a side elevation of a hose coupler embodying my improvements; Fig. 2 is a longitudinal section taken on the line 2—2 of Fig. 1; Fig. 3 is a section taken on the line 3—3 of Fig. 2; and Fig. 4 is a detail perspective view of the pivoted coupling yoke.

Referring in detail to the drawing 5 designates the male coupling head which is threaded upon the sleeve H' secured to one of the hose sections H, and 6 designates the female coupling head which is threaded upon a similar sleeve secured to the other of the hose sections. The female coupling head 6 is provided with an internal annular shoulder 7 against which the end of the reduced nipple 8 formed upon the male coupling head abuts. A rubber washer 9 is arranged upon said nipple between the end of the female head and the shoulder 10 on the end of the male head which is provided by the formation of the nipple 8 thereon.

The male coupling head 5 is formed with an annular enlarged portion 11 which is of the same diameter as the external diameter of the female head, and in this enlarged annular portion of the male head, at diametrically opposite points, the headed pins 12 are threaded. The female coupling head 6 is reduced in diameter for substantially one-half of its length as indicated at 13, and upon this reduced portion of the head a rotatable collar 14 is mounted. This collar is retained in position by means of a ring or sleeve 15 which is disposed upon the end of the coupling head and rigidly secured thereto by means of a screw 16. Headed pins 17 are also threaded in the collar 14 at diametrically opposite points, the inner face of the heads of the pins being spaced from the periphery of the collar. Upon these pins, the coupling yoke 18 is mounted for pivotal movement, the arms 19 of said yoke being provided with openings 20 in their extremities to receive the pins. Upon the other ends of the arms 19 a substantially semicircular bar 21 is integrally formed and is adapted to lie upon the annular enlargement 11 of the male coupling head when the yoke is in its coupling position. Upon the free ends of the arms 19, the locking lugs 22 are formed and extend oppositely to the bowed bar 21. The extremities of these lugs are curved as clearly shown in Fig. 4 and are adapted to engage around the shanks of the pins 12 on the male coupling head between the periphery of the enlargement 11 and the inner faces of the heads 12' of said pins, the extremities of said lugs extending beneath the pins. In this manner the liability of accidental release of the coupling yoke from engagement with the pins 12 when being dragged upon the ground is entirely eliminated.

From the above description it is believed that the construction of my improved hose coupler will be readily understood. The nipple 8 of the male coupling head may be easily and quickly inserted in the female head and the coupling yoke positioned by rotating the collar 14 to dispose said yoke in position for engagement with the pins 12 on the male head when the yoke is swung down into its locking position. Thus it is unnecessary to twist or turn the hose to bring the yoke into its proper position with respect to the pins 12. The quick coupling of the hose sections is thus greatly facilitated. The bowed bar 21 of the coupling yoke is preferably bent intermediate of its ends as shown at 21' to be engaged by the finger so that the yoke may be easily and conveniently lifted to release the hose sections when the same are uncoupled.

The device is extremely strong and durable and provides very efficient means for quickly coupling the hose sections, the usual threading of the coupling heads together which requires considerable time, being dispensed with. Owing to the simplicity of the device, it will be obvious that the same can be constructed at an extremely low cost.

While I have shown and described the preferred construction and arrangement of the various parts, it will be understood that the device is susceptible of considerable modification without departing from the essential feature or sacrificing any of the advantages thereof.

Having thus described the invention what is claimed is:—

In a hose coupling, a male coupling head carried by one of the hose sections to be coupled together, a female coupling head on the other hose section, the exterior diameter of said female head being reduced for substantially one-half of its length, a collar rotatably mounted upon said reduced portion of the coupler head, a retaining ring for said collar arranged upon the reduced portion of the head and rigidly fixed thereto, pins threaded in said collar at diametrically opposite points having enlarged heads, a coupling yoke comprising parallel arms provided with openings in their ends to receive said pins whereby said yoke is pivotally secured on the head, said arms being integrally connected at their other ends by the bowed portion of the yoke, lugs formed on said arms extending oppositely to the bow of said yoke, said lugs being curved at their extremities, pins threaded in the male coupling head at diametrically opposite points, said pins being provided with enlarged heads spaced from the periphery of the coupling head, the curved ends of the lugs of said yoke being adapted to engage around the shank portions of the pins between their heads and the periphery of the male coupling head when the heads are coupled together, the bow of the coupling yoke engaging closely upon the periphery of the male coupling head, said bow being bent intermediate of its ends and disposed out of contact with the coupling head whereby the coupling yoke may be conveniently grasped and elevated to uncouple the hose sections.

In testimony whereof I hereunto affix my signature in the presence of two witnesses.

JOHN GREENLUND.

Witnesses:
D. E. JUNKINS,
SIMON NUGENT.